US006574399B2

(12) United States Patent
Boudreau et al.

(10) Patent No.: US 6,574,399 B2
(45) Date of Patent: Jun. 3, 2003

(54) CERAMIC WAFERBOARD FOR INTEGRATION OF OPTICAL/ OPTOELECTRONIC/ELECTRONIC COMPONENTS

(75) Inventors: Robert A. Boudreau, Corning, NY (US); Songsheng Tan, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/015,914

(22) Filed: Nov. 2, 2001

(65) Prior Publication Data

US 2003/0086652 A1 May 8, 2003

(51) Int. Cl.[7] .................................................. G02B 6/30
(52) U.S. Cl. .............................. 385/49; 385/88; 385/89; 385/92; 385/93
(58) Field of Search ............................. 385/88, 89, 90, 385/91, 92, 93, 94, 49, 14

(56) References Cited

U.S. PATENT DOCUMENTS

| | | | | |
|---|---|---|---|---|
| 4,904,036 A | * | 2/1990 | Blonder | 385/88 |
| 5,611,008 A | * | 3/1997 | Yap | 385/14 |
| 6,456,761 B2 | * | 9/2002 | Yap et al. | 385/88 |

* cited by examiner

*Primary Examiner*—Phan T. H. Palmer
(74) *Attorney, Agent, or Firm*—Juliana Agon; Price, Heneveld, Cooper, DeWitt & Litton

(57) ABSTRACT

An optoelectronic module includes a ceramic waferboard having a groove configured to passively position an optical fiber. The ceramic waferboard includes an alignment feature configured to passively position an optical component. An optical device is secured to the ceramic waferboard in contact with the alignment feature to thereby position the optical device. An optical fiber is positioned in the groove with an end of the optical fiber positioned adjacent the optical device to thereby optically couple the optical fiber to the optical device. The optoelectronic module also includes an integrated circuit chip secured to the ceramic waferboard, and a conductive material disposed on the ceramic waferboard and electrically coupling the integrated circuit chip to the optical device.

21 Claims, 2 Drawing Sheets

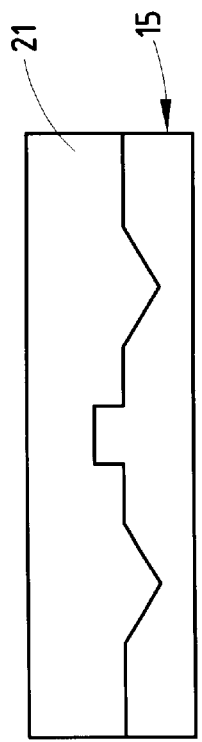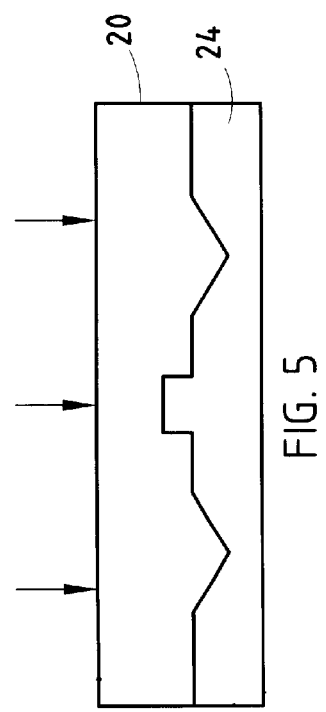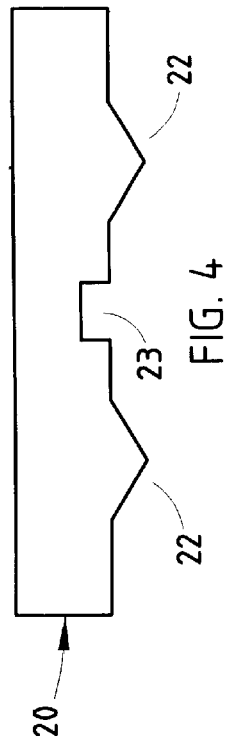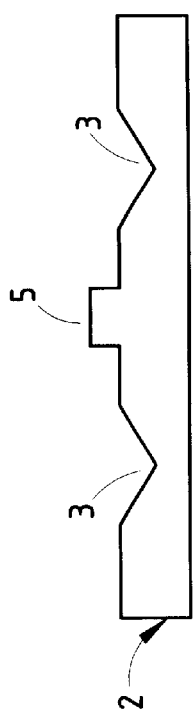

CERAMIC WAFERBOARD FOR INTEGRATION OF OPTICAL/OPTOELECTRONIC/ELECTRONIC COMPONENTS

BACKGROUND OF THE INVENTION

1. Field of the Invention

The present invention relates to waferboards that may be utilized to integrate optical, optoelectronic and/or electronic components.

2. Technical Background

"Silicon Waferboard Technology (SWT)" has been widely used as "Silicon Optical Bench (SiOB)" for hybrid integration of optoelectronic, electronic, and optical components. Mechanical alignment features or vision alignment marks fabricated on the surface of a silicon chip in SWT have been used to passively align the active area of Lasers or Detectors with the core of optical fibers in units such as receiver and transmitter modules.

SWT is a hybrid integration of optoelectronic devices including laser arrays, detector arrays, laser driver circuits, and single-mode optical fibers for making low cost fiber optical and optoelectronic products. SWT presently includes vision passive alignment and mechanical passive alignment methods. Both technologies use V-grooves etched in silicon wafers to precisely position the single-mode optical fibers. The vision alignment method (see, e.g. K. Kurata et al., "A Surface Mount Type Single-Mode Laser Module Using Passive Alignment", Proceeding of 45$^{th}$ ECTC conference, 1995, pp. 759) uses two alignment marks patterned on the laser diode (LD) bottom face and on the silicon surface of the waferboard to achieve the passive alignment. The mechanical passive alignment method uses mechanical alignment features fabricated on the LD bonding side and on the surface of a silicon substrate to achieve the passive alignment. (see, e.g., C.A. Armiento et al., "Hybrid optoelectronic integration of transmitter arrays on silicon waferboard", Proceeding of SPIE, Sep. 3–4 1991, Boston, Mass., pp. 112.)

In general, passive alignment reduces the process cost compared to active alignment. Active alignment requires that the devices be operated during assembly, which may be difficult and expensive to do.

However, present SWT may suffer from various drawbacks. One potential problem involves V-groove etching. Silicon V-groove structures have been broadly used for the placement of optical fibers. The positioning accuracy of optical fibers is determined by V-groove structures formed on the silicon substrate. These V-grooves are fabricated by anisotropic etching of Si using etchants such as KOH solutions. During such etching in silicon, the {111} planes are attacked at a much slower rate than the other crystallographic planes in the anisotropic etchants. When a masked opening along the [110] crystal orientation of the (100) silicon wafers is etched in anisotropic etchant, V-shaped groove or truncated V-grooves will be formed after a certain time of etching. The beveled sides of V-grooves are {111} crystallographic planes having the lowest etch rates. Typically, the etching rate ratio between (100) and (111) planes is in the range of 40–200 depending on the etching conditions. For single mode passive alignment applications, the total positioning tolerance between laser diode chip and an optical fiber is controlled within a 1 $\mu$m or smaller range. The lateral positions (x, y) of V-groove are normally defined by photolithography, and can reach sub-micron alignment accuracy if the V-groove structures are formed along [110] crystal direction of the silicon substrates. The vertical position of fiber inside the V-groove is determined by the V-groove width. Therefore, the alignment of the V-groove opening along with [110] crystal direction and the control of V-groove width are extremely critical for single mode fiber applications.

Although accuracy is critical, accurate alignment of the V-groove opening along the [110] crystal direction may be difficult. Known processes produce silicon wafers with a certain deviation in wafer orientation and in the primary flat direction. The single crystal orientation cuts along the (100) crystal plane with an accuracy of ±0.5°–1.0°. The primary flat cuts along the [110] crystal direction with an accuracy of ±0.5°–1.0°. The misalignment of the V-groove opening will cause the shifting of the center axis of the V-groove and the excess undercut of V-groove. A pre-alignment method can partially solve the problem caused by the primary flat not being along {110} crystal direction, but there is presently no known way to solve the problem caused by the wafer orientation deviation. Thus, the V-groove etching process is presently limited to a manual mode, wherein each wafer is individually custom etched and measured limiting the potential for mass production of such wafers.

Another potential problem associated with existing SWT may occur during high frequency operation of a silicon waferboard. The increasing demand for bandwidth and data throughput of optoelectronic modules leads to increasing the operating frequency of modules, such as 10 Gb/s for OC192 modules and 40 Gb/s for OC768 modules. However, silicon is a high loss substrate material for microwave transmission. The optimized value of microwave transmission loss in SiOB obtained is about–3 db/cm at 40 GHz. The impedance of coplanar waveguide (CPW) on SiOB varies with the operation frequency, which is caused by the effect of interface states. The impedance of the CPW is not fixed as designed with the operation frequency, so the reflection intensity of the microwave signal will change too. The relatively long process cycle of existing SWT processing may present additional problems. Furthermore, the processing steps of typical silicon waferboard products are quite complicated. Processing may include 8–9 mask levels and more than 39 steps. The complexity of the silicon waferboard process results in relatively low process yield and relatively high fabrication costs.

SUMMARY OF THE INVENTION

One aspect of the present invention involves forming a silicon waferboard having mechanical passive alignment features. A mold is then made from the silicon waferboard via electron forming. Green (unsintered) ceramic tape is formed in the mold and then sintered to form a ceramic waferboard having substantially the same mechanical passive alignment features as the silicon waferboard utilized to make the mold.

Another aspect of the present invention is an optoelectronic module including a ceramic waferboard having a groove configured to passively position an optical fiber. The ceramic waferboard includes an alignment feature configured to passively position an optical component. An optical device is secured to the ceramic waferboard in contact with the alignment feature to thereby position the optical device. An optical fiber is positioned in the groove with an end of the optical fiber positioned adjacent the optical device to thereby optically couple the optical fiber to the optical device. The optoelectronic module also includes an integrated circuit chip secured to the ceramic waferboard, and a conductive material is disposed on the ceramic waferboard and electrically couples the integrated circuit chip to the optical device.

Another aspect of the present invention is a method of making a ceramic waferboard, including providing a silicon waferboard having a surface with at least one passive alignment structure. A mold is made from the silicon waferboard such that a portion of the mold is configured to reproduce the alignment structure. Unsintered ceramic material is engaged with the mold such that a portion of the unsintered material has a shape that is substantially the same as the alignment structure of the silicon waferboard. The ceramic material is sintered to form a ceramic waferboard.

Yet another aspect of the present invention is a method of fabricating an optical module, including providing a silicon waferboard having a surface with at least one passive alignment element. A mold is made from the silicon waferboard such that a portion of the mold is configured to reproduce the alignment element. Unsintered ceramic material is brought into engagement with the mold such that a portion of the unsintered ceramic material has a shape that is substantially the same as the alignment element of the silicon waferboard. The ceramic material is sintered to form a ceramic waferboard, and an optical component is secured to the ceramic waferboard utilizing the alignment element. An optical fiber is also secured to the ceramic waferboard.

Additional features and advantages of the invention will be set forth in the detailed description which follows and will be apparent to those skilled in the art from the description or recognized by practicing the invention as described in the description which follows together with the claims and appended drawings.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description serve to explain the principals and operation of the invention.

BRIEF DESCRIPTION OF THE DRAWINGS

FIG. 2 is a schematic front elevational view of a silicon waferboard having passive alignment structure;

FIG. 3 is a schematic, side elevational view showing electronic forming of a mold;

FIG. 4 is a schematic front elevational view of the mold;

FIG. 5 is a schematic front elevational view showing the molding of the unsintered ceramic tape; and FIG. 6 is a schematic front elevational view of the ceramic waferboard after sintering.

DETAILED DESCRIPTION OF THE PREFERRED EMBODIMENT

Figure 1:
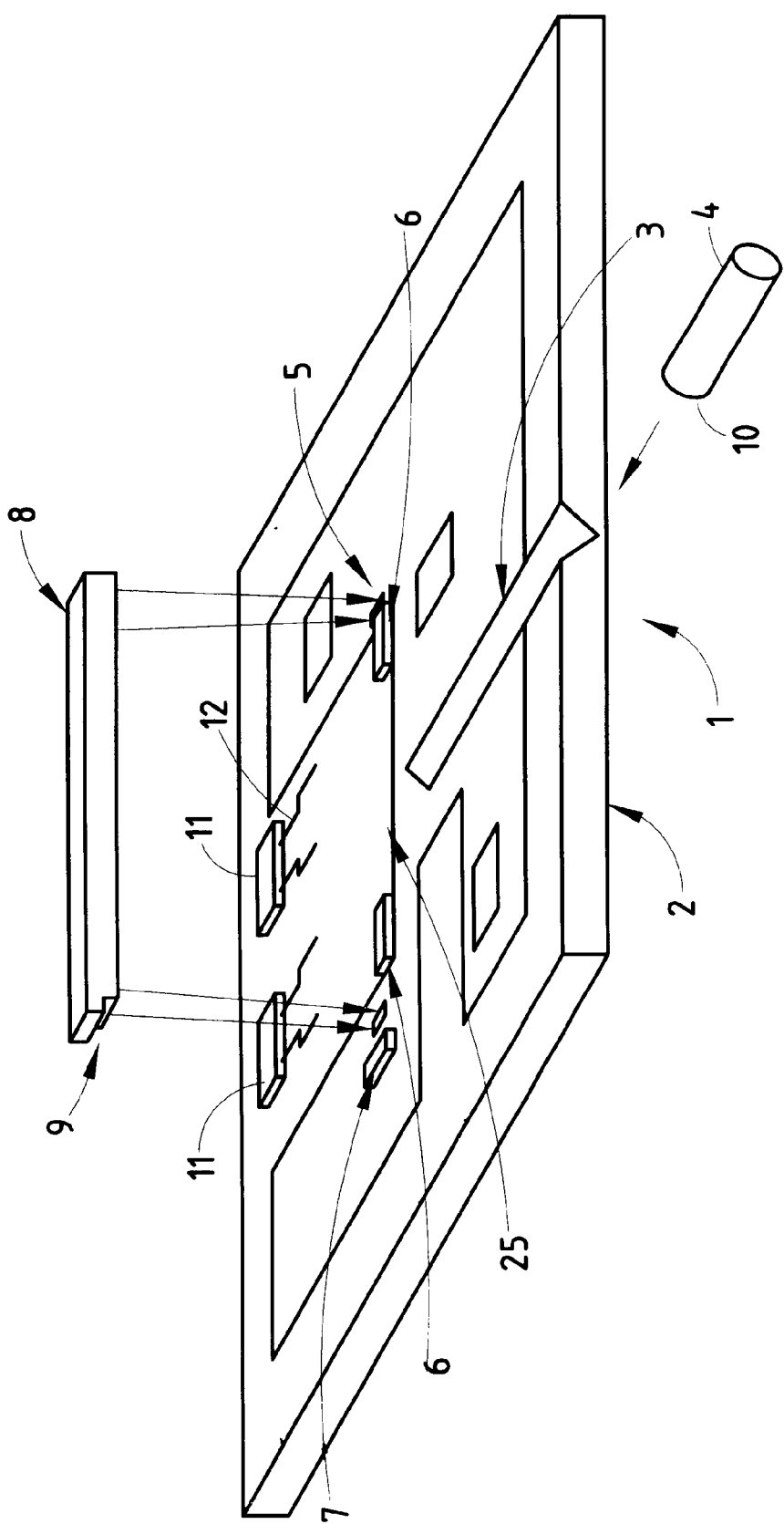
FIG. 1 is an exploded, partially schematic perspective view showing an optoelectronic module including a ceramic waferboard according to one aspect of the present invention.

With reference to FIG. 1, an optoelectronic module 1 according to one aspect of the present invention includes a ceramic waferboard 2 having a groove 3 configured to passively position an optical fiber 4 in the groove 3. The ceramic waferboard 2 includes one or more alignment features such as stand offs 5, forward pedestals 6, and a left pedestal 7 that are configured to passively position an optical component such as a laser bar 8 in predetermined alignment with an end of fiber 4. The laser bar or array 8 includes an alignment notch 9 to passively position the laser bar against the left pedestal. In the illustrated example, a laser bar or array 8 is secured to the ceramic waferboard 2.

However, it is anticipated that various other optical components, such as receivers, transmitters or the like could also be secured to the ceramic waferboard 2. When assembled, the optical fiber 4 is positioned in the groove 3 with an end 10 of the optical fiber 4 positioned adjacent the laser bar 8 to thereby optically couple the optical fiber 4 to the laser bar 8. One or more integrated circuit chips may be secured to the ceramic waferboard 2, with conductive material in the form of traces 12 electronically coupling the integrated circuit chips 11 to the laser bar 8. Advantageously, the ceramic waferboard 2 may serve as the module package body, a multi chip module (MCM) substrate, and the module level connection all in a single integrated part.

The ceramic waferboard 2 is fabricated as illustrated schematically in FIGS. 2–6. First, a silicon waferboard master 15 is fabricated utilizing conventional silicon processing technology. For example, the silicon surface 16 may be reactive ion etched using a $Cl_2$-based chemistry to form alignment pedestals 5 with vertical walls 17. The V-grooves 3 are etched utilizing conventional techniques, such as a KOH-alcohol solution. The silicon waferboard master 15 is utilized to fabricate the mold 20, such that accurate tolerancing of the passive alignment structures is required to ensure that the mold 20, and the ceramic waferboards 2 made from the molds 20, are sufficiently precise to provide the required alignment of the optical components secured to the ceramic waferboard 2. Although the tolerances depend upon the particular application for which the ceramic waferboard 2 is being utilized, in general, the dimensions of V-grooves 3 are controlled to within ±1 micrometer. Because the techniques for forming the various passive alignment structure such as the grooves 3, stand offs 5, and forward pedestals 6 of silicon waferboard 15 are known in the art, the fabrication of the silicon wafer master 15 will not be further described herein.

With further reference to FIG. 3, during fabrication conductive metal material is formed on the silicon waferboard master 15 via known electroplating processes. During such electroplating processes, a seed layer of conductive metal such as nickel, copper, zinc or the like may first be deposited, and another layer of conductive metal material may then be deposited on the seed layer. Although various conductive metals may be utilized, conductive metal 21 is preferably a nickel material. After the electroplating process is completed, the mold 20 is separated from the silicon waferboard 15 utilizing mechanical force. The mold 20 includes ridges 22 corresponding to the V-grooves 3. The mold 20 may also include recesses 23 corresponding to the stand offs 5 or pedestals 6 or 7, depending upon the configuration of silicon waferboard 15.

With further reference to FIG. 5, the mold 20 is pressed into contact with an unsintered ceramic tape 24. Ceramic tape 24 is preferably a low temperature co-fired ceramic material available from Dupont Corporation of Wilmington, Del. Ceramic tape 24 is preferably a Dupont Green Tape™ ceramic having a thickness of about 0.25 mm (0.010 inches thick). This material is preferably the 951 GT LTCC or LTCC ceramic. The LTCC material of ceramic tape 24 has very low electrical losses, even at higher frequencies, compared to other substrate materials. Furthermore, the coefficient of thermal expansion of the 951 GT LTCC material is almost the same as that of GaAs material thereby alleviating stresses that could otherwise result from dissimilar expansion properties between GaAs components and the ceramic waferboard 2. Furthermore, the ceramic tape 24 can be sintered in a process that provides zero or close to zero shrinkage. The fired X, Y shrinkage tolerances for the ceramic tape 24 are 0.01%. Thus, the present technique provides a ceramic waferboard 2 having highly precise passive alignment structures. Furthermore, the ceramic material provides very low electrical loss compared to silicon, even at high frequencies.

With reference to FIG. 1, after the ceramic waferboard 2 is sintered, known masking techniques can be utilized to form traces 12 of conductive material to electrically interconnect the integrated circuit chips 11 and the laser bar 8 or other optical device. A layer of solder 25 is utilized to secure the laser bar 8 to the ceramic waferboard 2. Various techniques and related equipment are known in the art for aligning and securing optical components and fibers passively, such that these aspects of the assembly of the optoelectronic module 1 will not be described in detail herein.

The ceramic waferboard 2 can be fabricated at a relatively high rate, and provides very precise passive alignment structures for mounting of optical fibers and components. Furthermore, the ceramic material alleviates the losses associated with other substrate materials at high frequencies.

It will become apparent to those skilled in the art that various modifications to the preferred embodiment of the invention as described herein can be made without departing from the spirit or scope of the invention as defined by the appended claims.

The invention claimed is:

1. An optoelectronic module, comprising:
   a ceramic waferboard having a groove configured to passively position an optical fiber, said ceramic waferboard including a ceramic pedestal forming an alignment feature configured to passively position an optical device;
   an optical device secured to said ceramic waferboard in contact with said alignment feature to thereby position said optical device;
   an optical fiber positioned in said groove with an end of said optical fiber positioned adjacent said optical device to thereby optically couple said optical fiber to said optical device;
   an integrated circuit chip secured to said ceramic waferboard; and
   a conductive material disposed on said ceramic waferboard and electrically coupling said integrated circuit chip to said optical device.

2. The optoelectronic module of claim 1, wherein:
   said groove includes substantially flat sidewalls that form a V shape in cross section, said sidewalls form an angle therebetween equal to that of {111} crystallographic planes of a silicon material.

3. The optoelectronic module of claim 2, wherein:
   said integrated circuit chip is made of a gallium arsenide material defining a first coefficient of thermal expansion, said ceramic waferboard having a second coefficient of thermal expansion that is substantially the same as said first coefficient of thermal expansion.

4. The optoelectronic module of claim 1, wherein:
   said optical device comprises a laser.

5. The optoelectronic module of claim 1, wherein:
   said optical device comprises an optical receiver.

6. The optoelectronic module of claim 1, wherein:
   said optical device comprises a lens.

7. The optoelectronic module of claim 1, wherein:
   said ceramic waferboard is made of an LTCC ceramic material.

8. The optoelectronic module of claim 1, wherein:
   said integrated circuit comprises a gallium arsenide integrated circuit; and including:
   a silicon integrated circuit coupled to said gallium arsenide integrated circuit.

9. The optoelectronic module of claim 1, wherein:
   said ceramic waferboard has a thickness of about 0.25 millimeters.

10. An optoelectronic module, comprising:
    a ceramic waferboard having a groove configured to receive an optical fiber therein, said ceramic waferboard including an alignment member configured to position an optical device in predetermined relationship to a fiber positioned in said groove, said alignment member comprising a ceramic pedestal integrally formed with said ceramic waferboard;
    an optical device secured to said ceramic waferboard in contact with said alignment member to position said optical device;
    an optical fiber positioned in said groove with an end of said optical fiber positioned adjacent said optical device to optically couple said optical fiber to said optical device;
    an integrated circuit chip secured to said ceramic waferboard; and
    a conductive material disposed on said ceramic waferboard and electrically coupling said integrated circuit chip to said optical device.

11. A method of making a ceramic waferboard, comprising:
    providing a silicon waferboard having a surface with at least one passive alignment structure;
    making a mold from said silicon waferboard such that a portion of said mold is configured to reproduce said alignment structure;
    engaging unsintered ceramic material with said mold such that a portion of said unsintered ceramic material is deformed into a shape that is substantially the same as said alignment structure of said silicon waferboard; and
    sintering said ceramic material to form a ceramic waferboard.

12. The method of claim 10, wherein:
    said passive alignment structure of said silicon waferboard comprises a pedestal such that said portion of said unsintered ceramic material forms an integral ceramic pedestal.

13. The method of claim 12, wherein:
    said passive alignment structure comprises a groove.

14. The method of claim 13, wherein:
    said groove includes substantially planar walls that converge such that said groove has a V-shape in cross section to locate an optical fiber.

15. The method of claim 11, including:
    securing an optical fiber to said ceramic waferboard; and
    securing an optical device to said ceramic waferboard such that said optical device is coupled with said optical fiber.

16. The method of claim 11, wherein:

said mold is made of metal by an electron forming process.

17. The method of claim 11, wherein:

said unsintered ceramic material comprises a sheet having a central layer sandwiched between constraining layers.

18. A method of fabricating an optical module, comprising:

providing a silicon waferboard having a surface with at least one passive alignment element;

making a mold from said silicon waferboard such that a portion of said mold is configured to reproduce said alignment element;

bringing unsintered ceramic material into engagement with said mold such that a portion of said unsintered ceramic material has a shape that is substantially the same as said alignment element of said silicon waferboard;

sintering said ceramic material to form a ceramic waferboard;

securing an optical component to said ceramic waferboard utilizing said alignment element; and securing an optical fiber to said ceramic waferboard.

19. The method of claim 18, wherein:

said alignment element comprises a protrusion; and said optical component is positioned using a mechanical passive alignment method.

20. The method of claim 18, wherein:

said ceramic waferboard includes a V-groove, said optical fiber positioned in said V-groove.

21. The method of claim 18, wherein:

said alignment element comprises a vision alignment mark; and said optical component is positioned using a vision passive method.

* * * * *